United States Patent [19]

Dykstra et al.

[11] Patent Number: 5,297,709

[45] Date of Patent: Mar. 29, 1994

[54] CONTAINER HOLDER

[75] Inventors: Ronald A. Dykstra, Grandville; Michael M. Warsaw, Holland, both of Mich.

[73] Assignee: Prince Corporation, Holland, Mich.

[21] Appl. No.: 863,076

[22] Filed: Apr. 3, 1992

[51] Int. Cl.⁵ ............................................. B60R 7/06
[52] U.S. Cl. ............................... 224/281; 224/282; 224/42.44; 296/37.12; 312/323; 248/311.2; 248/293
[58] Field of Search ............ 224/273, 278, 279, 280, 224/281, 311, 42.43, 42.44, 42.42, 282, 42.45; 296/37.8, 37.9, 37.11, 37.12, 37.13; 108/25, 40, 45, 44; 312/310, 313, 323, 322; 248/311.2, 293; 211/80; 206/45.15, 562, 563; 220/331; 297/146, 145, 194, 191

[56] References Cited

U.S. PATENT DOCUMENTS

| | | | |
|---|---|---|---|
| 2,487,537 | 11/1949 | Gentner | 224/281 X |
| 2,510,545 | 6/1950 | Brabham | 224/42.44 X |
| 3,190,241 | 6/1965 | Rodgers et al. | 108/45 |
| 3,606,112 | 9/1971 | Cheshier | 224/42.44 |
| 4,286,742 | 9/1981 | Pellegrino | 224/281 |
| 4,417,764 | 11/1983 | Marcus et al. | 297/194 |
| 4,530,480 | 7/1985 | Pratt | 248/311.2 |
| 4,643,280 | 2/1987 | Hensley | 108/44 X |
| 4,728,018 | 3/1988 | Parker | 224/273 |
| 4,738,423 | 4/1988 | DiFilippo et al. | 248/311.2 |
| 4,756,572 | 7/1988 | Dykstra et al. | 297/194 |
| 4,792,174 | 12/1988 | Shioda | 296/37.12 |
| 4,892,281 | 1/1990 | DiFilippo et al. | 248/311.2 |
| 4,907,775 | 3/1990 | Lorence et al. | 248/311.2 |
| 4,953,771 | 9/1990 | Fischer et al. | 224/273 |

FOREIGN PATENT DOCUMENTS

| | | | |
|---|---|---|---|
| 253107 | 4/1963 | Australia | 224/281 |
| 109754 | 4/1990 | Japan | 224/42.42 |

Primary Examiner—Henry J. Recla
Assistant Examiner—Glenn T. Barrett
Attorney, Agent, or Firm—Price, Heneveld, Cooper, DeWitt & Litton

[57] ABSTRACT

A container holder is operably mounted to the front of an instrument panel for minimal intrusion into the passenger compartment of the vehicle. The container holder includes a housing having a slot therein with an elongate width, and a drawer operably mounted in the slot and sequentially movable between a retracted position for storage adjacent the instrument panel, an extended position aligned with the slot, and a lowered use position extending outwardly into the vehicle passenger compartment. The housing includes a notch adapted to engage a mating lip on the instrument panel for positioning and supporting the container holder thereon.

16 Claims, 3 Drawing Sheets

CONTAINER HOLDER

BACKGROUND OF THE INVENTION

The present invention relates to container holders for vehicles and particularly to a container holder storage system.

Numerous devices have been designed to hold containers such as cups, mugs, pop cans, glasses, and the like in vehicles. Many of these devices are adapted to move between a use position and an out-of-the-way storage position in a console or armrest so that they can be used only when desired and do not unnecessarily take up valuable space. Often they are stored in a center armrest between front passenger seats. However, not all vehicles have an armrest between the front passenger seats, nor does such a location always provide optimum placement of the container holder.

Some container holders that can be movably stored have been designed for attachment to the instrument panel of a vehicle, such as illustrated in U.S. Pat. No. 3,606,112 to Cheshier and U.S. Pat. No. 4,738,423 to DiFilippo. However, these cupholders require A horizontal opening extending into or below the instrument panel of the vehicle. The space necessary for such a horizontal opening may not be available at the desired height, given the compact design and mounting of a large number of components in modern instrument panels. Further, such horizontally extending openings are expensive to add to instrument panels since they cannot be easily retrofitted.

Thus, a container holder that optimizes use of vehicular space, container placement, ease of operation, and ease of installation including retrofitting is desired.

SUMMARY OF THE INVENTION

The present invention provides a container holder for a vehicle which can be retrofitted to the instrument panel of the vehicle or installed as original equipment without interfering with other instrument panel components. The container holder includes a housing having an inclined slot and a drawer movably mounted in the slot for movement between a retracted position for storage and an extended and lowered horizontal use position. In the preferred embodiment, the housing can be retrofitted to the lower central portion of an existing instrument panel with the drawer being positioned adjacent the instrument panel in an inclined position when retracted into the slot to minimize intrusion into the passenger compartment. The drawer is extendable to an intermediate extended position from the housing where it can be rotated to a horizontal use position held in a cantilever fashion by the housing.

Thus, the present invention provides a compact convenient storage system for a container holder which is relatively inexpensive and can be installed as original equipment or retrofitted to a vehicle. These and other features, objects and advantages of the present invention will become apparent to one of ordinary skill in the art upon reading the following description of the preferred embodiment in conjunction with the claims and accompanying drawings in which:

DETAILED DESCRIPTION OF THE PREFERRED EMBODIMENT

Figure 1:
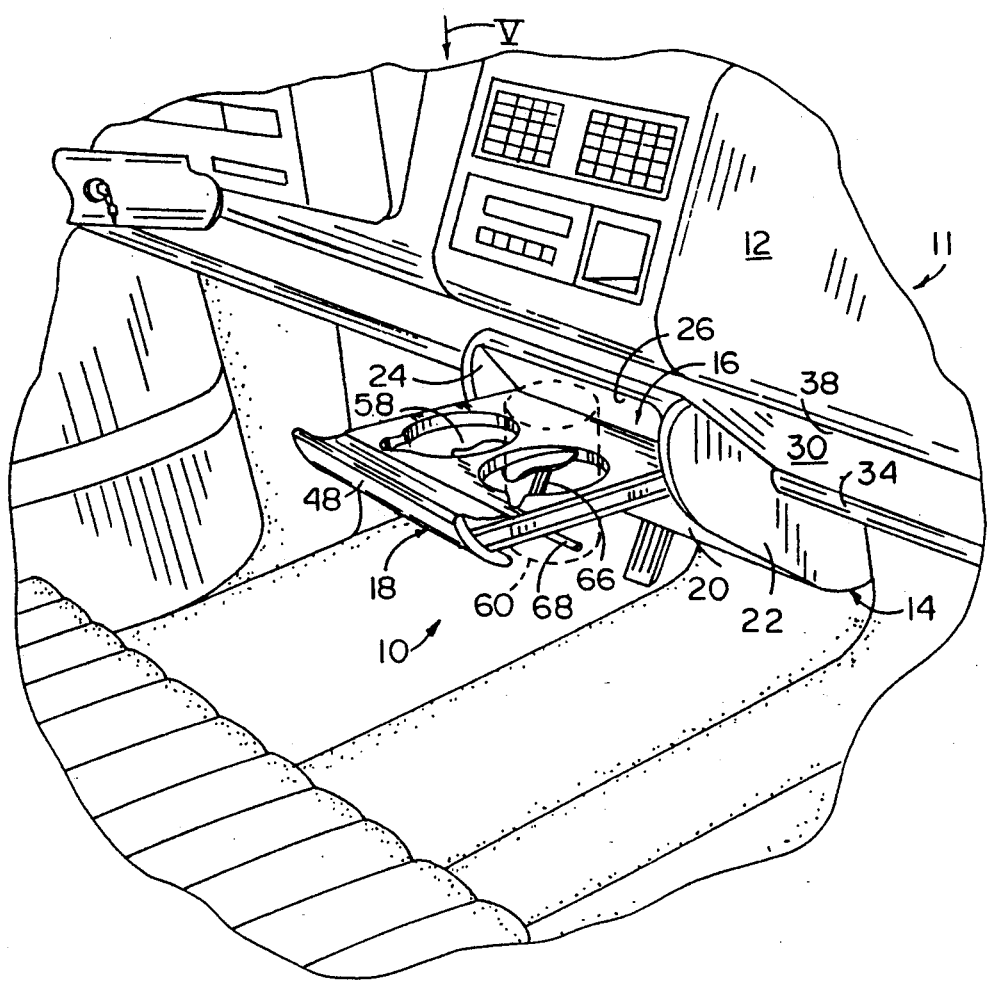
FIG. 1 is a fragmentary perspective view of a vehicle including a container holder embodying the present invention.

As seen in FIG. 1, a vehicle 11 such as an automobile includes a container holder assembly 10 embodying the present invention which is particularly adapted to mount to the lower central area of an instrument panel 12 of the vehicle. Container holder assembly 10 may however be mounted on other panels in the vehicle where a storable container holder is desired but where it is not possible or practicable to form a horizontally extending slot in such panels. Container holder assembly 10 includes a housing 14 with a downwardly and forwardly angled slot 16, and a drawer 18 slideably mounted in the slot for sequential movement between a retracted position for storage adjacent the instrument panel 12 (FIG. 2), an intermediate extended position aligned with the axis of slot 16 (FIG. 3), and a tilted-down lowered use position extending outwardly into the passenger compartment of the vehicle for use as seen in FIGS. 4 and 5.

Referring now to FIGS. 1-4, housing 14 includes a box-like outer shell 19 with a front wall 20 and two sidewalls 22 and 24. An integral web 26 extends between the upper ends of sidewalls 22 and 24 and defines the upper end of an opening 28 for slot 16 defined further by the inner edges of walls 20, 22 and 24. The rear edges 27 of sidewalls 22 and 24 are shaped to mateably rest against the face or exposed surface 30 of instrument panel 12. Each wall 22 and 24 includes a notch 32 that engages a horizontally extending lip 34 on instrument panel 12. Notches 32 and lip 34 serve to locate and orient housing 14 on instrument panel 12 and also support the housing 14. The contacting surfaces of notches 32 and lip 34 are inclined towards instrument panel 12 so that the weight of the housing biases it into engagement with the instrument panel 12. The upper end of web 26 includes a rearwardly extending flange 36 that presses into an inclined surface 38 on instrument panel 12, further wedging notch 32 into lip 34. Attachment screws (not shown) are employed to secure housing 14 to the instrument panel 12 during installation. Notably, this arrangement, and in particular notches 32, allow housing 14 to be retrofitted to face 30 of an instrument panel 12 without significant rework of the instrument panel. This design therefore facilitates both original equipment assembly and later retrofit, such as at a dealership.

Figure 2:
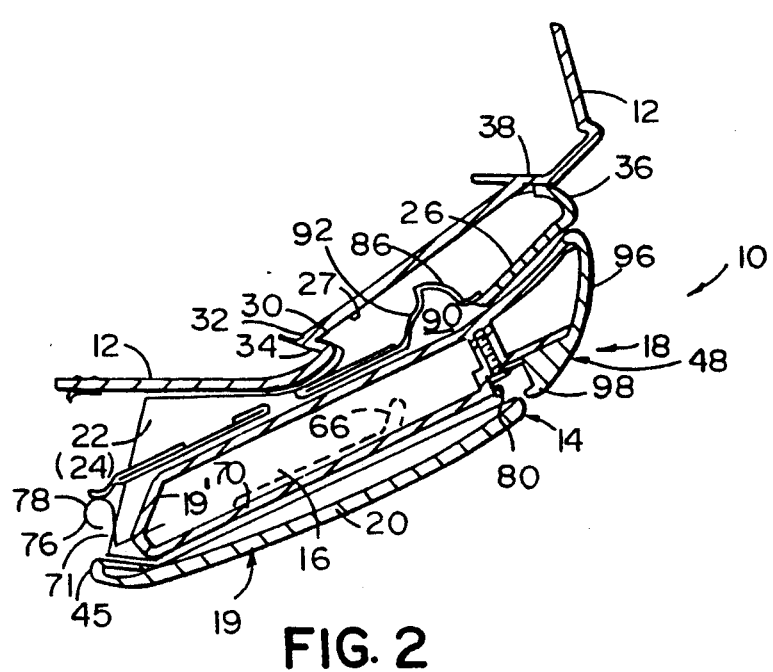
FIGS. 2-4 are vertical cross-sectional views of the container holder shown in FIG. 1, showing the drawer in sequential positions from its stored to use positions.

Slot 16 which receives drawer 18 is defined by an insert 40 (FIG. 3) to housing 14 that attaches to the inside of cover shell 19 by attachment screws 45 which thread into bosses in cover 19. Insert 40 includes an inner top wall 42, inner bottom wall 43, and inner sidewalls 44 which define an elongate width for receiving drawer 18 so that slot 16 can position drawer 18 as closely as possible to face 30 of instrument panel 12 when drawer 18 is in the retracted stored position as seen in FIG. 2.

Figure 3:
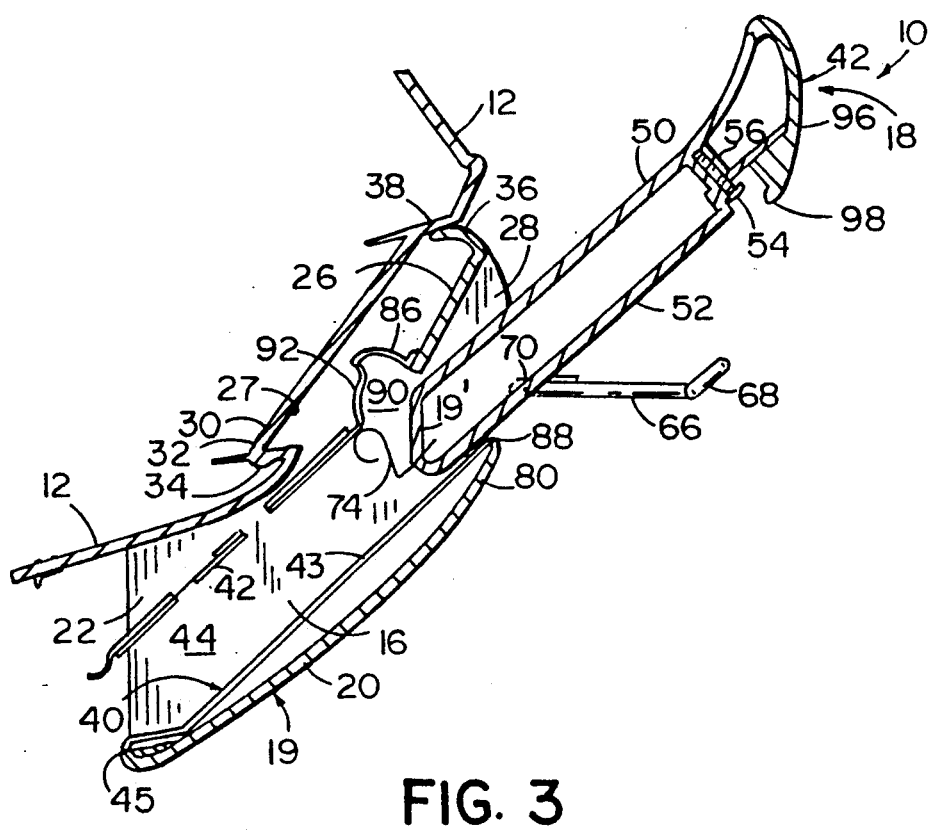
Figure 4:
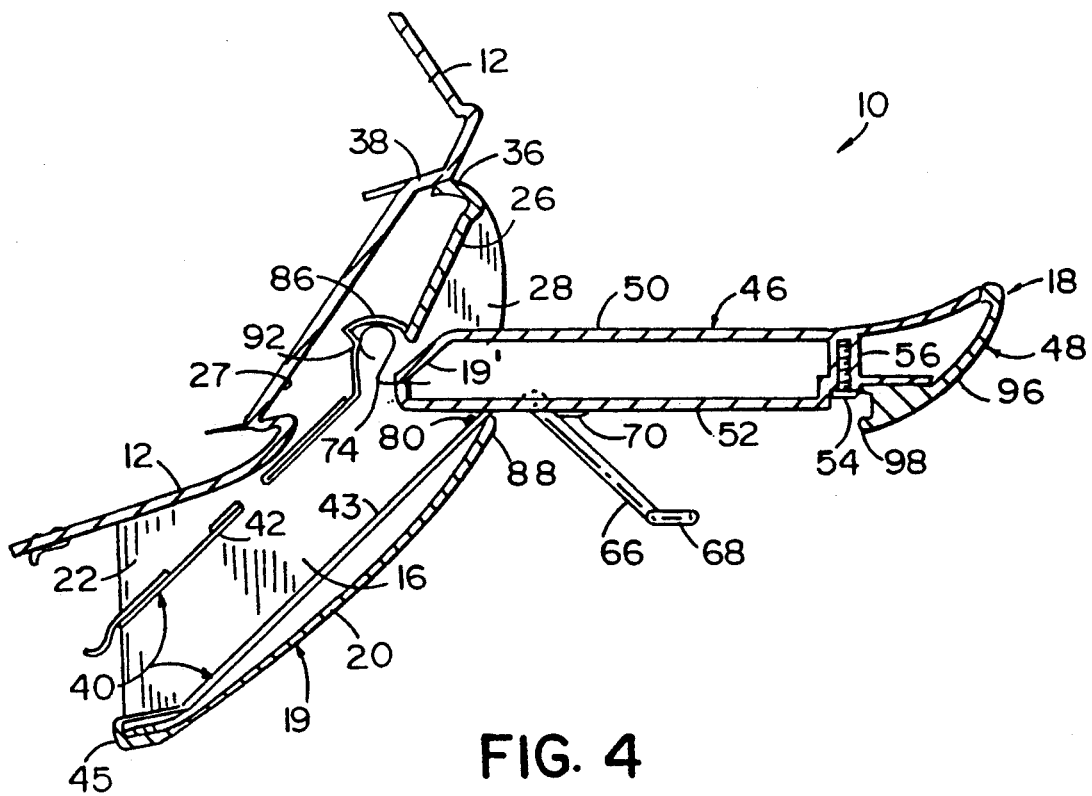
Figure 5:
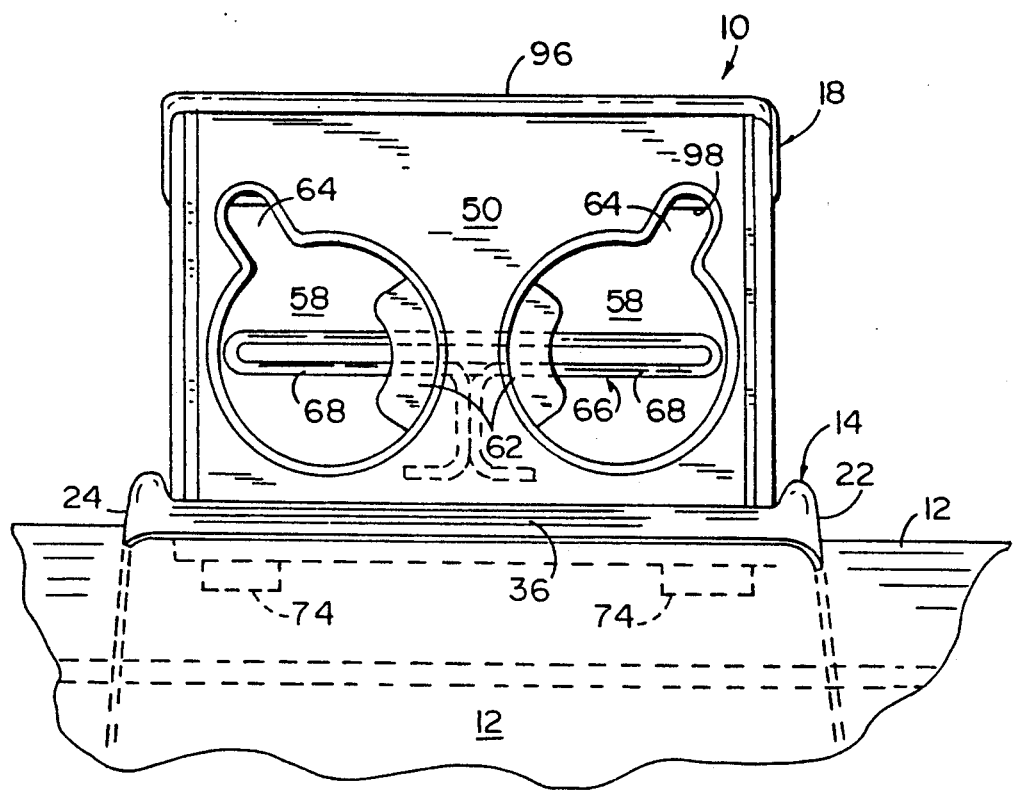
FIG. 5 is a fragmentary top plan view of the container holder shown in FIG. 1 viewed in the direction of arrow V in FIG. 1.

Drawer 18, as best seen in FIGS. 3 and 4, includes a shelf 46 and an outer cover defining an opening handle 48. Shelf 46 is constructed of upper and lower members 50 and 52 which are held together and attached to handle 48 by screws 54 which extend through attachment holes into bosses 56 on upper member 50. It is contemplated that other attachment means could also be used such as an adhesive or thermoplastic welding. Sidewalls 44 of drawer 18 serve as guides and, together with the edges of upper and lower members 50 and 52, guide drawer 18 into slot 16.

Shelf 46, as best seen in FIGS. 1 and 5, includes apertures 58 for receiving containers such as cups or a beverage can 60 shown in phantom in FIG. 1. Resilient members 62 are held between members 50 and 52, and extend inwardly into apertures 58 from shelf 46 to bias beverage can 60 toward one side of aperture 58 to snugly hold the beverage can 60 within the aperture. Aperture 58 also includes a slot 64 on one side to receive the handle of a mug.

Handle 48 of the drawer 18, as best seen in FIG. 3, extends between the front edges of upper and lower members 50 and 52 and includes an arcuate outer surface 96 that aligns with flange 36 of web 26 and the front of front wall 20 of housing 14 to provide an aesthetic appearance when drawer 18 is fully closed and stored within housing 14 in which position handle 48 serves as a cover for opening 28 of slot 16. Handle 48 also includes a lower lip 98 that is raised at least a part of the width of handle 48 to provide a finger grip for pulling the drawer 14 outwardly. Use of a separate handle 48 allows the handle to conform to the vehicle interior color although it is contemplated that handle 48 could be integrated into either members 50 and 52 of drawer 18.

A T-shaped support 66 (FIGS. 3-5) for supporting the bottom of a container is pivotally mounted to the bottom of shelf 46 with the top cross bar 68 of support 66 extending outwardly below apertures 58 as best seen in FIG. 5 for supporting the bottom of a container thereon. A spring 70 is operably mounted to the pivotal end of support 60 to bias container support 66 toward an open position. As drawer 14 is moved to the retracted stored position, support 66 contacts the edge of opening 28 to slot 16, forcing support 66 into a folded position adjacent drawer 14 as seen in FIG. 2.

Two generally L-shaped leaf springs 74 (FIGS. 2-5) extend rearwardly and upwardly from the rear wall 19 of drawer 18 to provide control of the drawer at its opposite ends of travel. For such purpose the ends 76 of the springs 74 are in the shape of a loop. When drawer 18 is in the retracted stored position (FIG. 2), free end 76 engages a first detent or depression 78 in inner top wall 42 to frictionally securely hold drawer 18 in place in the stored position. As drawer 18 is slid from a retracted position (FIG. 2) to an intermediate extended position (FIG. 3), springs 74 slide on inner top wall 42 and along with sidewalls 44 and bottom wall 43 add stability to drawer 18 improving the control of the drawer. The outward extension of drawer 18 is limited by a protrusion 80 that extends within a slot (not shown) in lower member 52 until protrusion engages the end of the slot limiting the linear extension of drawer 18. The outward movement of drawer 18 can however be limited in a number of different ways.

As drawer 18 reaches its fully extended position (FIG. 3), springs 74 are positioned to enter a second detent or depression 86 in inner top wall 42 as the drawer 18 is pivoted downwardly from the extended position (FIG. 3) to the lowered use position (FIG. 4) by pivoting about an edge 88 of opening 16. Depression 86 includes an arcuate rear wall 92 and a downwardly oriented pocket 90. In the lowered use position (FIG. 4), leaf springs 74 engage pocket 90 of inner top wall 42 and a segment of lower member 52 rests on the upper front edge 88 of inner bottom wall 43 to support drawer 18 in the horizontal position in a cantilever-type mounting arrangement. Thus, it is seen with the container holder of the present invention, a compact convenient and self-contained container holder system is provided for supporting beverage containers or other drinking containers in a vehicle. In the preferred embodiment of the invention, the container holder is particularly shaped and adapted to be attached to the inclined face of an instrument panel, where it can be sequentially moved between a retracted storage position, an extended intermediate position, and a pivotally lowered use position. It will become apparent to those skilled in the art that various modifications to the preferred embodiment of the invention can be made without departing from the spirit or scope thereof as defined by the appended claims.

The embodiments of the invention in which an exclusive property or privilege is claimed are defined as follows:

1. A container holder for a vehicle comprising:
   a housing including a curvilinear mounting surface shaped to mateably engage a curvilinear front surface of a vehicle instrument panel and further including means for mounting said housing to the curvilinear front surface of the vehicle instrument panel, said housing including a slot formed therein; and
   a drawer dimensioned to fit within said slot including at least one aperture for holding a container therein, said drawer further including means for movably mounting said drawer in said slot to move sequentially between a retracted position with said slot, an intermediate extended position aligned with said slot, and a downwardly pivoted use position in which said aperture is positioned horizontally for use.

2. The apparatus as defined in claim 1 wherein said housing is shaped to fit against an exposed portion of an instrument panel of a vehicle.

3. The apparatus as defined in claim 1 and further including a container support pivotally mounted to said drawer, said container support being pivotable to a use position when said drawer is moved to said lowered use position, wherein said container support extends under said aperture for supporting a container placed in said aperture, and wherein said container support pivots to a stored position adjacent said drawer when said drawer is moved to said retracted position within said housing.

4. The apparatus as defined in claim 1 including detent means for holding said drawer in said lowered use position.

5. The apparatus as defined in claim 1 wherein said slot includes a first support surface, and a second support surface spaced from said first support surface, and said first and second support surfaces cooperate to support said drawer in a cantilever fashion when said drawer is in said lowered use position.

6. A container holder for a vehicle comprising:
   a housing including means for mounting said housing to an inclined surface of a vehicle, said housing including a slot formed therein, said housing being shaped to fit against an exposed portion of an instrument panel of a vehicle, said housing including a notch adapted to engage a mating lip on the instrument panel, said notch positioning and supporting said housing on the instrument panel; and a drawer dimensioned to fit within said slot including at least one aperture for holding a container therein, said drawer further including means for movably mounting said drawer in said slot to move sequentially between a retracted position within said slot, an intermediate extended position aligned with said slot, and a downwardly pivoted use position in which said aperture is positioned horizontally for use.

7. The apparatus as defined in claim 6 wherein said drawer includes a handle that covers said slot when said drawer is in said retracted position, and which further facilitates grasping and moving said drawer to said extended position.

8. The apparatus as defined in claim 7 wherein said handle includes an arcuately curved outer surface that forms a substantially flush surface with said housing when said drawer is in said retracted position.

9. A container holder for a vehicle comprising:
a housing including means for mounting said housing to an inclined surface of a vehicle, said housing including a slot formed therein;
a drawer dimensioned to fit within said slot including at least one aperture for holding a container therein, said drawer further including means for movably mounting said drawer in said slot to move sequentially between a retracted position within said slot, an intermediate extended position aligned with said slot, and a downwardly pivoted use position in which said aperture is positioned horizontally for use;
detent means for holding said drawer in said lowered use position; and
said housing including a depression in said slot, and said detent means including a spring operably mounted on said drawer to slide with said drawer and engage said depression when said drawer is moved to said lowered use position.

10. A container holder for a vehicle comprising:
a housing including a slot having an elongate width, said housing further including a curvilinear mounting surface shaped to mateably engage a curvilinear surface in the vehicle so that the housing can be retrofittably attached to a completely assembled vehicle;
means for mounting the housing to the curvilinear surface in the vehicle;
a drawer dimensioned to fit within said slot and including at least one aperture for holding a container therein;
slide means for slideably mounting said drawer in said slot for translational movement between a retracted position and an intermediate extended position; and
pivot means defining an axis extending generally horizontally across said slot width for pivotally mounting said drawer in said slot about said axis, said drawer being pivotally movable between said extended position and a lowered use position, said drawer defining a vertical plane as said drawer moves between said retracted position, said extended position, and said lowered use position.

11. The apparatus as defined in claim 10 including detent means for holding said drawer in said lowered use position.

12. A container holder for a vehicle comprising:
a housing including a slot having an elongate width, said housing including a notch adapted to engage a mating lip on an instrument panel, said notch positioning and supporting said housing on the instrument panel;
a drawer dimensioned to fit within said slot and including at least one aperture for holding a container therein;
slide means for slideably mounting said drawer in said slot for translational movement between a retracted position and an intermediate extended position; and
pivot means defining an axis extending generally horizontally across said slot width for pivotally mounting said drawer in said slot about said axis, said drawer being pivotally movable between said extended position and a lowered use position, said drawer defining a vertical plane as said drawer moves between said retracted position, said extended position.

13. A container holder for a vehicle comprising:
a housing including a slot having an elongate width;
a drawer dimensioned to fit within said slot and including at least one aperture for holding a container therein;
slide means for slideably mounting said drawer in said slot for translational movement between a retracted position and an intermediate extended position; and
pivot means defining an axis extending generally horizontally across said slot width for pivotally mounting said drawer in said slot about said axis, said drawer being pivotally movable between said extended position and a lowered use position, said drawer defining a vertical plane as said drawer moves between said retracted position, said extended position, and said lowered use position;
detent means for holding said drawer in said lowered use position; and
said housing including a depression in said slot, and said detent means including a spring operably mounted on said drawer to slide with said drawer and engage said depression when said drawer is moved to said lowered use position.

14. A container holder for a vehicle comprising:
a housing including an angled slot having an elongate width, said housing including a notch adapted to engage a mating lip on the instrument panel, said notch providing positioning and supporting said housing on the instrument panel;
a drawer having sides that are dimensioned to fit mateably within said slot, said drawer including at least one aperture for holding a container therein; and
means located on said drawer for movably mounting said drawer in said slot to move between a retracted position for hidden storage within said slot, an intermediate extended position aligned with said slot, and a lowered use position whereat said aperture is positioned for use and said drawer is misaligned with said slot, said drawer being held in said lowered position at least in part by gravity.

15. The apparatus as defined in claim 14 including detent means for holding said drawer in said lowered use position.

16. A container holder for a vehicle comprising:

a housing including an angled slot having an elongate width;

a drawer having sides that are dimensioned to fit mateably within said slot, said drawer including at least one aperture for holding a container therein; and means located on said drawer for movably mounting said drawer in said slot to move between a retracted position for hidden storage within said slot, an intermediate extended position aligned with said slot, and a lowered use position whereat said aperture is positioned for use and said drawer is misaligned with said slot, said drawer being held in said lowered position at least in part by gravity;

detent means for holding said drawer in said lowered use position; and said housing including a depression in said slot, and said detent means including a spring operably mounted on said drawer to slide with said drawer and engage said depression when said drawer is moved to said lowered use position.

* * * * *

UNITED STATES PATENT AND TRADEMARK OFFICE
CERTIFICATE OF CORRECTION

PATENT NO. : 5,297,709
DATED : March 29, 1994
INVENTOR(S) : Ronald A. Dykstra et al.

It is certified that error appears in the above-indentified patent and that said Letters Patent is hereby corrected as shown below:

Column 1, line 23;
 "A" should be --a--.

Signed and Sealed this

Sixth Day of September, 1994

Attest:

BRUCE LEHMAN

*Attesting Officer*     *Commissioner of Patents and Trademarks*